(12) United States Patent
Miller et al.

(10) Patent No.: US 11,207,991 B2
(45) Date of Patent: Dec. 28, 2021

(54) VEHICLE CHARGING SYSTEM FOR DC FAST CHARGING ELECTRIFIED VEHICLES

(71) Applicant: FORD GLOBAL TECHNOLOGIES, LLC, Dearborn, MI (US)

(72) Inventors: Theodore James Miller, Milan, MI (US); Renata Michaela Arsenault, Plymouth, MI (US); Hadi Malek, Dearborn, MI (US); Stephanie Janczak, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1005 days.

(21) Appl. No.: 15/379,813

(22) Filed: Dec. 15, 2016

(65) Prior Publication Data

US 2018/0170201 A1   Jun. 21, 2018

(51) Int. Cl.
| | |
|---|---|
| *H02J 7/00* | (2006.01) |
| *B60L 53/14* | (2019.01) |
| *B60L 53/10* | (2019.01) |
| *B60L 53/31* | (2019.01) |
| *B60L 53/53* | (2019.01) |
| *B60L 53/62* | (2019.01) |
| *B60L 53/60* | (2019.01) |

(52) U.S. Cl.
CPC ............. *B60L 53/14* (2019.02); *B60L 53/11* (2019.02); *B60L 53/31* (2019.02); *B60L 53/53* (2019.02); *B60L 53/60* (2019.02); *B60L 53/62* (2019.02); *B60L 2210/10* (2013.01); *Y02T 10/70* (2013.01); *Y02T 10/7072* (2013.01); *Y02T 90/14* (2013.01); *Y02T 90/16* (2013.01)

(58) Field of Classification Search
CPC .................................................... Y02T 90/14
USPC ........................................................ 320/109
See application file for complete search history.

(56) References Cited

U.S. PATENT DOCUMENTS

| | | | | |
|---|---|---|---|---|
| 7,468,562 | B1* | 12/2008 | Barbie | B60H 1/143 180/65.1 |
| 7,956,579 | B2* | 6/2011 | Dishman | H01M 10/441 320/104 |
| 8,106,632 | B2* | 1/2012 | Delaille | H02J 7/0019 320/132 |
| 2009/0133733 | A1* | 5/2009 | Retti | H01M 10/465 136/206 |
| 2012/0013299 | A1 | 1/2012 | Prosser et al. | |
| 2013/0057200 | A1* | 3/2013 | Potts | H02J 50/12 320/107 |
| 2013/0221918 | A1* | 8/2013 | Hill | H02J 7/34 320/109 |
| 2015/0035370 | A1* | 2/2015 | Wyatt | H01M 10/625 307/77 |
| 2015/0037642 | A1* | 2/2015 | Pinon | H01M 2/1077 429/99 |
| 2015/0054460 | A1* | 2/2015 | Epstein | B60L 53/64 320/109 |
| 2015/0165915 | A1* | 6/2015 | Cun | H02J 7/342 320/101 |
| 2018/0015834 | A1* | 1/2018 | Karlson | B60L 53/11 |

* cited by examiner

*Primary Examiner* — Yalkew Fantu
(74) *Attorney, Agent, or Firm* — David B. Kelley; Carlson, Gaskey & Olds

(57) ABSTRACT

A vehicle charging system includes a battery bank including at least one repurposed battery and a charging station in electrical communication with the battery bank and configured to deliver a DC output from the battery bank to an electrified vehicle.

27 Claims, 4 Drawing Sheets

VEHICLE CHARGING SYSTEM FOR DC FAST CHARGING ELECTRIFIED VEHICLES

TECHNICAL FIELD

This disclosure relates to vehicle charging systems for charging electrified vehicles. An exemplary vehicle charging system is equipped with a battery bank capable of dispensing a number of DC fast charging events for fast charging the battery packs of electrified vehicles.

BACKGROUND

The desire to reduce automotive fuel consumption and emissions is well known. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. An infrastructure of easily accessible, economically viable, and energy efficient charging stations is desired for charging electrified vehicles.

SUMMARY

A vehicle charging system according to an exemplary aspect of the present disclosure includes, among other things, a battery bank including at least one repurposed battery and a charging station in electrical communication with the battery bank and configured to deliver a DC output from the battery bank to an electrified vehicle.

In a further non-limiting embodiment of the foregoing vehicle charging system, the battery bank is housed inside the charging station.

In a further non-limiting embodiment of either of the foregoing vehicle charging systems, the battery bank is housed separately from the charging station.

In a further non-limiting embodiment of any of the foregoing vehicle charging systems, a cooling system is configured to thermally manage the battery bank.

In a further non-limiting embodiment of any of the foregoing vehicle charging systems, the cooling system includes a chiller.

In a further non-limiting embodiment of any of the foregoing vehicle charging systems, the battery bank includes a plurality of battery assemblies.

In a further non-limiting embodiment of any of the foregoing vehicle charging systems, a controller is configured to control operation of the battery bank and the charging station during DC fast charging events.

In a further non-limiting embodiment of any of the foregoing vehicle charging systems, the controller is configured to schedule charging of the battery bank during off-peak conditions of an external power source.

In a further non-limiting embodiment of any of the foregoing vehicle charging systems, supply equipment extends outside of a housing of the charging station.

In a further non-limiting embodiment of any of the foregoing vehicle charging systems, the at least one repurposed battery is a repurposed electrified vehicle battery pack.

In a further non-limiting embodiment of any of the foregoing vehicle charging systems, an inverter is disposed between the battery bank and an external power source.

In a further non-limiting embodiment of any of the foregoing vehicle charging systems, the battery bank is electrically connected to the charging station upstream of rectifier diodes of a rectification stage of a DC circuit of the charging station.

In a further non-limiting embodiment of any of the foregoing vehicle charging systems, the DC output of the battery bank is connected to a power cord of the charging station.

In a further non-limiting embodiment of any of the foregoing vehicle charging systems, the battery bank is electrically connected to the charging station downstream of rectifier diodes of a rectification stage of a DC circuit of the charging station.

In a further non-limiting embodiment of any of the foregoing vehicle charging systems, the DC output of the battery bank is connected to a DC link capacitor of the DC circuit.

A method according to another exemplary aspect of the present disclosure includes, among other things, charging a battery bank of a vehicle charging system using AC power from an external power source, and charging a battery pack of an electrified vehicle using DC power stored in the battery bank. The battery bank includes a repurposed battery.

In a further non-limiting embodiment of the foregoing method, the method includes electrically connecting the battery bank to a charging station of the vehicle charging system.

In a further non-limiting embodiment of either of the foregoing methods, electrically connecting the battery bank includes connecting a DC output from the battery bank to the charging station upstream of rectifier diodes of a first rectification stage of a DC circuit of the charging station.

In a further non-limiting embodiment of any of the foregoing methods, electrically connecting the battery bank includes connecting a DC output from the battery bank to the charging station downstream of rectifier diodes of a first rectification stage of a DC circuit of the charging station.

A vehicle charging system according to another exemplary aspect of the present disclosure includes, among other things, a charging station and a battery bank electrically connected to the charging station either upstream or downstream of rectifier diodes of a rectification stage of a DC circuit of the charging station.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle charging systems for charging electrified vehicle battery packs. An exemplary vehicle charging system includes a battery bank and one or more charging stations electrically connected to the battery bank. The battery bank may include one or more repurposed batteries and is configured for dispensing a finite number of direct current (DC) fast charging events for charging electrified vehicles. These and other features are discussed in greater detail in the following paragraphs of this detailed description.

Figure 1:
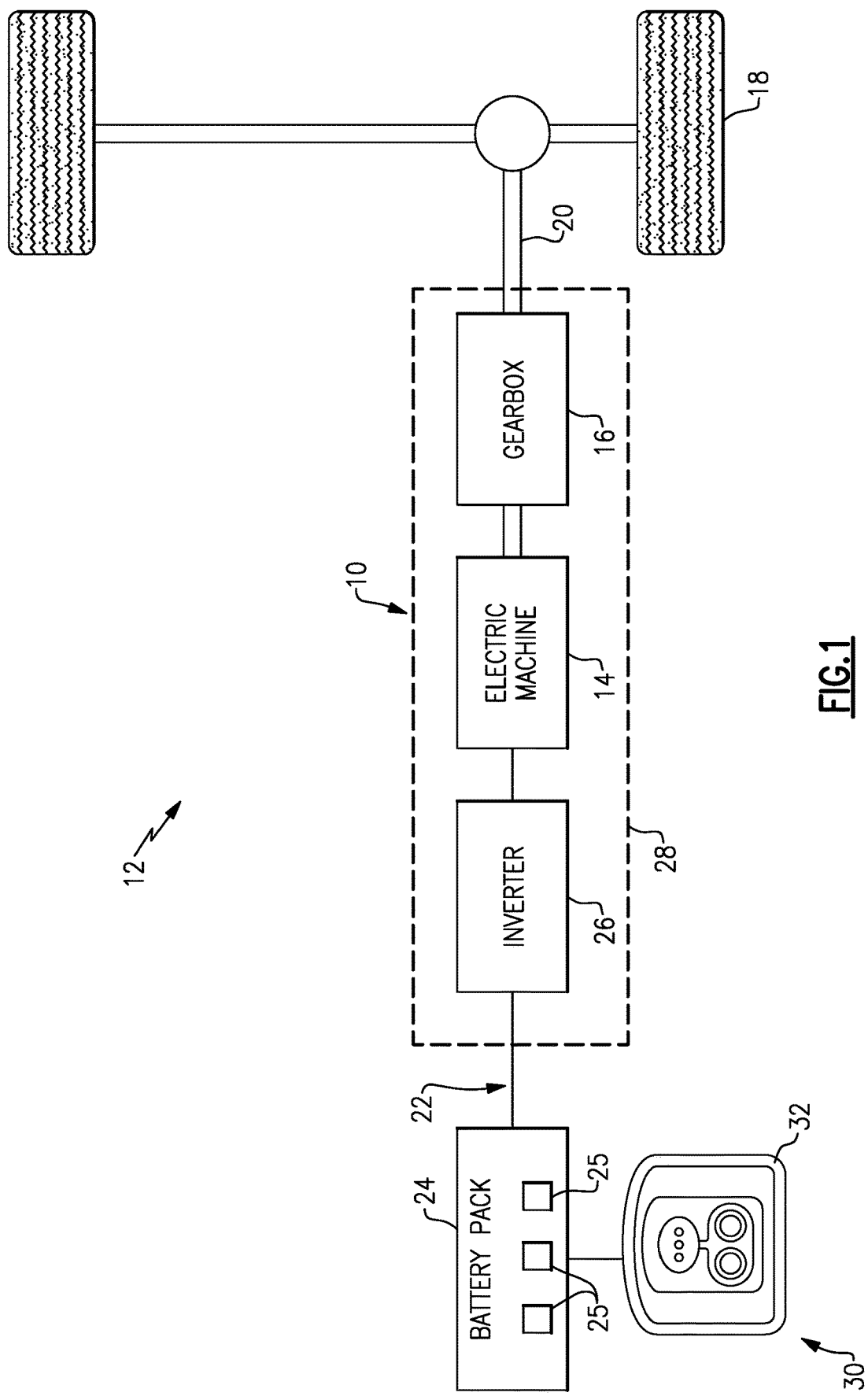
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's). Therefore, although not shown in this non-limiting embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the energy storage devices (e.g., battery cells) of the battery pack 24. The charging system 30 may be connected to a charging station which is in turn connected to an external power source (not shown) for receiving and distributing power to the energy storage devices. For example, in a non-limiting embodiment, the charging system 30 includes a charging port 32 located on-board the electrified vehicle 12. The charging port 32 is adapted to selectively receive power from the charging station, such as from a power cable connected to the charging station, and then distribute the power to the battery pack 24 for charging the energy storage devices.

The charging system 30 may be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
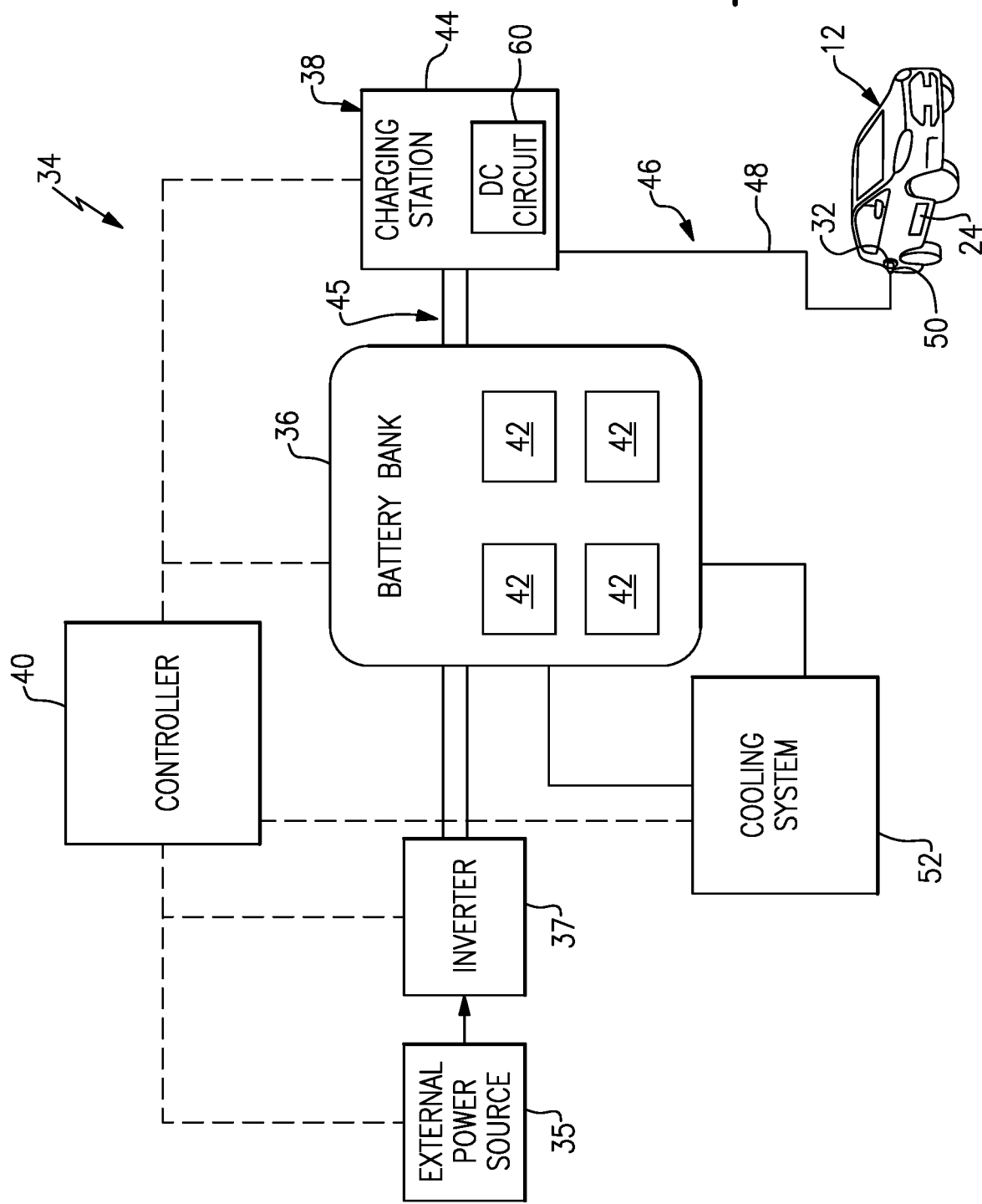
FIG. 2 schematically illustrates a vehicle charging system for charging electrified vehicles.

FIG. 2 illustrates a vehicle charging system 34 for charging electrified vehicles that are parked in proximity thereto. For example, the vehicle charging system 34 can be employed to charge the battery pack 24 of the electrified vehicle 12 of FIG. 1, or other electrified vehicles. It should be understood that the various components of FIG. 2 are shown schematically to better illustrate the features of this disclosure and are not necessarily depicted to scale.

The vehicle charging system 34 may be connected to the electrified vehicle 12 to charge the battery pack 24. In a non-limiting embodiment, the vehicle charging system 34 is configured to perform DC fast charging events. DC fast charging events are relatively immediate, rapid charge events that typically last approximately thirty minutes or less. The vehicle charging system 34 employs DC fast charging by delivering direct current at power rates between approximately 50 A and 500 A at between 200 V and 600 V to rapidly charge the battery pack 24, as opposed to the typical 4 A to 15 A output of standard alternating current chargers, by way of one non-limiting example.

The vehicle charging system 34 is connected to an external power source 35 (shown schematically). In a non-limiting embodiment, the external power source 35 includes a grid power source. In another non-limiting embodiment, the external power source 35 includes an alternative energy source, such as solar power, wind power, etc. In yet another non-limiting embodiment, the external power source 35 includes both a grid power source and one or more alternative energy sources.

The exemplary vehicle charging system 34 includes a battery bank 36, a charging station 38, and a controller 40. The battery bank 36, or stationary battery, includes one or more battery assemblies 42, or groupings of battery cells, that store electrical power received from the external power source 35. The battery assemblies 42 can be arranged in parallel or series configurations to meet desired power requirements. The energy stored in the battery assemblies 42 of the battery bank 36 can be used to deliver a finite number of DC fast charging events to electrified vehicles before the need to recharge the battery bank 36.

In a non-limiting embodiment, the battery assemblies 42 include one or more repurposed batteries. In another non-limiting embodiment, the battery assemblies 42 are repurposed electrified vehicle battery packs. A repurposed electrified vehicle battery pack is, for example, a battery pack that is no longer able to fulfill the rigors of the relatively demanding vehicle propulsion duties but still has some available working capacity (e.g., 50% capacity or more). The repurposed battery pack may include repurposed battery modules integrated with a new controller or entire battery packs with their own battery management systems that are integrated into a higher level system governed by a master (supervisory) controller. In yet another non-limiting embodiment, unused, or new battery packs could be used within the battery bank 36.

The vehicle charging system 34 may additionally include an inverter 37. The inverter 37 is positioned between the external power source 35 and the battery bank 36 and is adapted to convert input AC voltage into DC voltage that can be used to charge the battery assemblies 42 of the battery bank 36. For example, the external power source 35 may provide 3-phase AC power to the inverter 37. From the inverter 37, DC power is available for charging the battery assemblies 42 at a predefined controlled rate. Although shown generically, the inverter 37 includes all the circuitry necessary for performing AC-to-DC conversions. In an alternative embodiment, the circuitry necessary for performing the AC-to-DC conversions is part of the battery bank 36. In yet another alternative embodiment, the circuitry for performing the AC-to-DC conversion is part of the controller 40.

Figure 3:
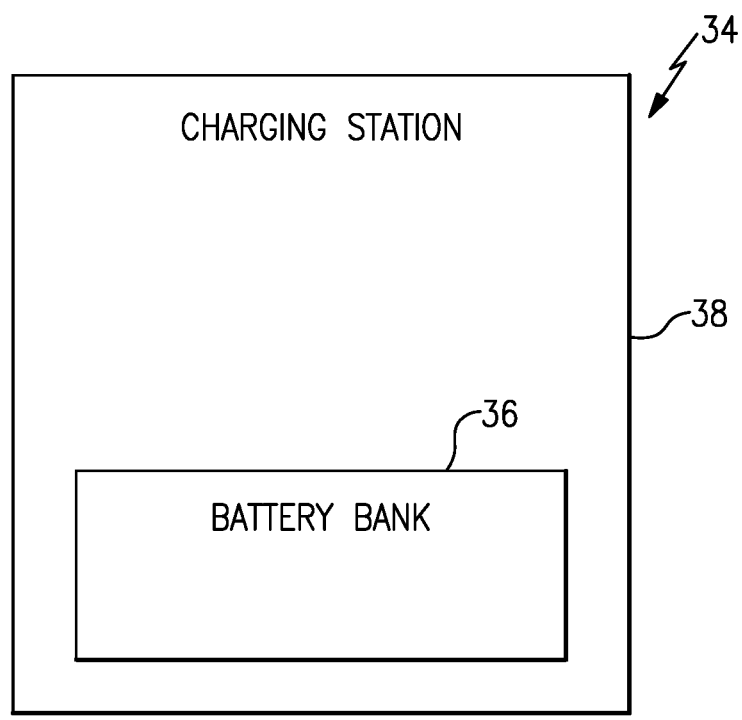
FIG. 3 schematically illustrates another exemplary vehicle charging system.
Figure 4:
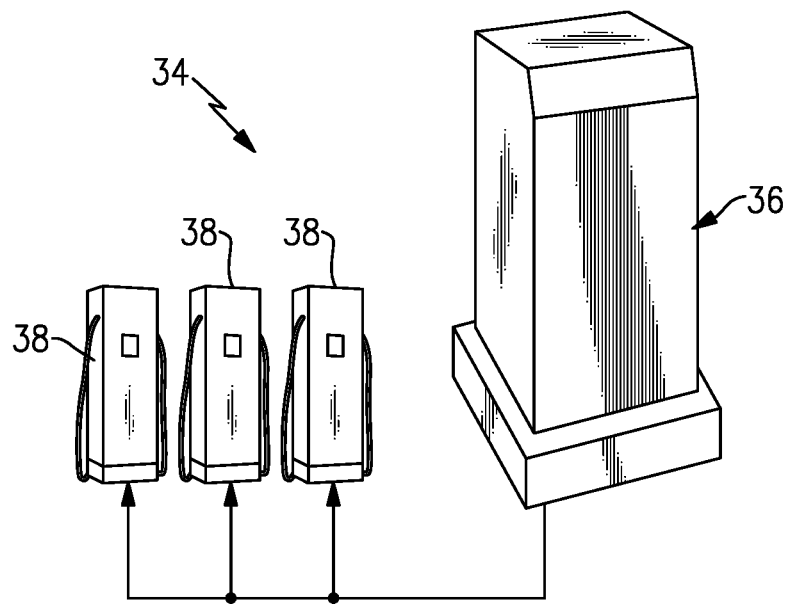
FIG. 4 illustrates yet another exemplary vehicle charging system.

In the non-limiting embodiment of FIG. 2, the battery bank 36 is housed separately from the charging station 38. However, in another non-limiting embodiment, the battery bank 36 is housed inside the charging station 38 (see, e.g., FIG. 3). In other words, the battery bank 36 could be part of the charging station 38. In addition, the battery bank 36 could be associated with a single charging station 38, as is shown in FIG. 2, or could be associated with multiple charging stations 38, as is shown in FIG. 4.

A DC power output from the battery bank 36 may be selectively supplied to the charging station 38 over a DC bus 45 for subsequent delivery to the electrified vehicle 12. The charging station 38 provides the interface for transferring the power from the battery bank 36 to the electrified vehicle 12. The charging station 38 may include a housing 44 and supply equipment 46 that extends externally from the housing 44. The supply equipment 46 includes one or more power cables 48 and a vehicle couplers 50 that may be coupled to the charging port 32 of the electrified vehicle 12. The supply equipment 46 allows the DC power from the battery bank 36 to be transferred to the electrified vehicle 12, and more particularly to the battery pack 24 of the electrified vehicle 12, during DC fast charging events.

In another non-limiting embodiment, such as when power is temporarily unavailable from the battery bank 36, the charging station 38 can supply the power for charging the electrified vehicle 12. The charging station 38 can receive power directly from the external power source 35 and includes a DC circuit for charging the electrified vehicle 12. In yet another non-limiting embodiment, the charging station 38 is equipped to charge the electrified vehicle 12 using Level 1 charging, Level 2 charging, or other convention charging protocols.

A relatively significant amount of heat may be generated in the battery bank 36 as a result of the charge rates supplied during DC fast charging events and due to the internal resistances of the battery cells of the battery bank 36. The vehicle charging system 34 may therefore include a cooling system 52 for managing this heat during charging events. In a non-limiting embodiment, the cooling system 52 is a closed-loop system that circulates a cooling medium (i.e., airflow or coolant through a portion of the battery bank 36 to remove heat. The cooling system 52) may include various conduits or passages (shown schematically) for communicating the cooling medium to and from the battery bank 36.

In another non-limiting embodiment, the cooling system 52 includes a chiller for removing heat from the cooling medium that is circulated to and from the battery bank 36.

The controller 40 of the vehicle charging system 34 performs multiple functions. The controller 40 is equipped with executable instructions for interfacing with and commanding operation of various components of the vehicle charging system 34. For example, in a non-limiting embodiment, the controller 40 communicates with each of the external power source 35, the inverter 37, the battery bank 36, the charging station 38, and the cooling system 52 over a controller area network (CAN) to control operation of the vehicle charging system 34. The controller 40 may be equipped with a processing unit and non-transitory memory for executing DC fast charging events or other charging events of the vehicle charging system 34.

A first exemplary function of the controller 40 is to schedule and command recharging of the battery assemblies 42 of the battery bank 36. In a non-limiting embodiment, the controller 40 communicates with the external power source 35 to recharge the battery bank 36 using AC power during off-peak conditions (e.g., low demand and low electricity costs) of the external power source 35. The controller 40 and the external power source 35 may communicate with one another via power line communications (PLC), over a controller area network (CAN), or using any other communication protocols.

The controller 40 may additionally monitor the battery assemblies 42 of the battery bank 36. For example, the controller 40 may monitor the state of charge (SOC) of each battery assembly 42, among many other battery parameters. In yet another non-limiting embodiment, the controller 40 can automatically command recharging of the battery bank 36 when the SOC of the battery assemblies 42 falls below a predefined threshold.

Another exemplary function of the controller 40 is to control the inverter 37 to convert AC power to DC power, such as when it is desirable to charge the battery bank 36. The controller 40 may also control communication of DC power from the battery bank 36 to the charging station 38 over the DC bus 45 when a DC fast charging event has been requested (i.e., the supply equipment 46 has been plugged into the charging port 32 of the electrified vehicle 12).

Yet another exemplary function of the controller 40 is to selectively transfer vehicle information (e.g., battery state of charge, or SOC) via a secure communication to a third party server. This information can be used to prioritize charge parameters based on the relative SOC of the battery bank 36, the battery pack 24, and other externalities. For example, this would allow the controller 40 to strategically limit charge event duration or energy transferred per event, etc., based upon instantaneous or near term demand, time-of-day dependent rates, etc.

The vehicle charging system 34 can be implemented on a wide-scale level without the need to completely redesign existing charging stations. For example, the charging station 38 may be of the type designed to receive 480 V AC input from the external power source 35. The charging station 38 may thus include a DC circuit 60 including an assembly of electronics configured to adjust the power level and conform to existing communication protocols for delivering DC power to the battery pack 24 of the electrified vehicle 12.

Figure 5:
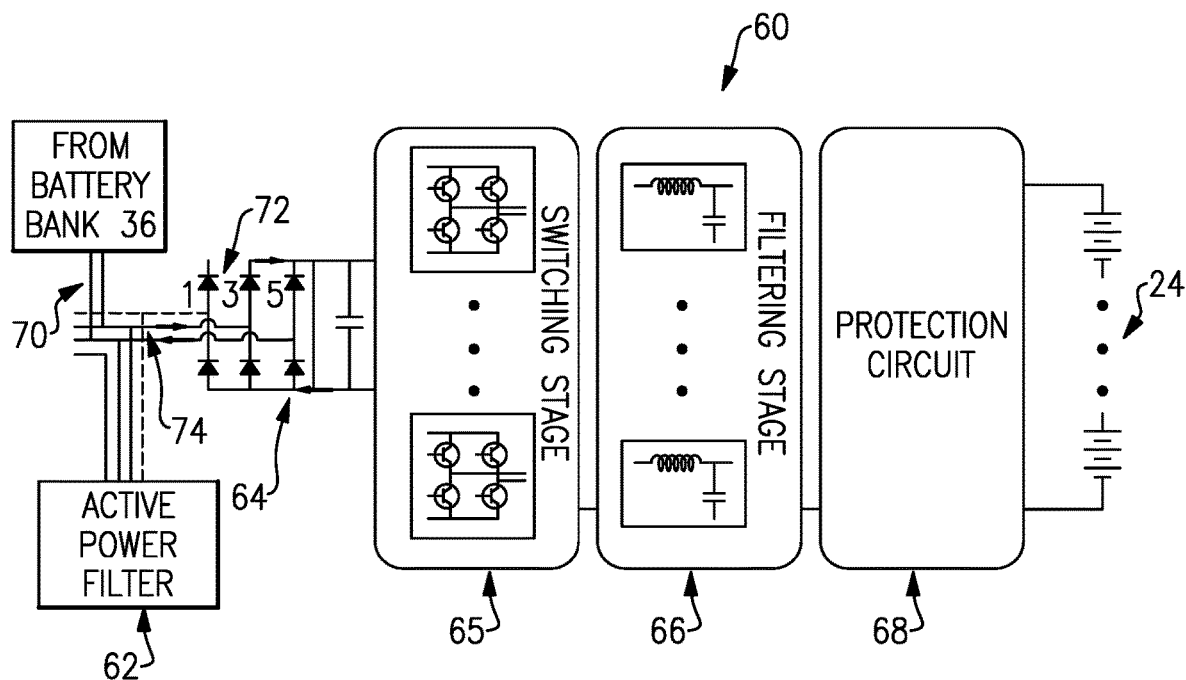
FIG. 5 is a schematic, system diagram of an interface between a battery bank and a charging station of a vehicle charging system.
Figure 6:
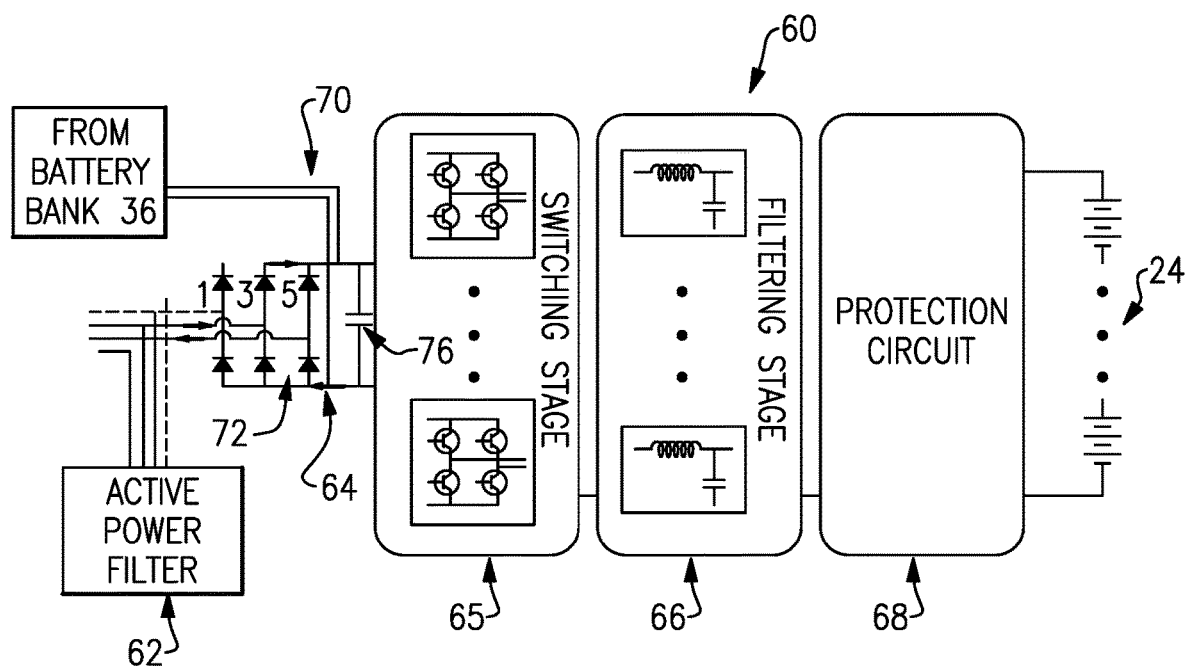
FIG. 6 is a schematic, system diagram of another interface between a battery bank and a charging station of a vehicle charging system.

Referring now to FIGS. 5-6, the DC circuit 60 may include an active power filter 62, a rectification stage 64, a switching stage 65, a filtering stage 66, and a protection circuit 68. A DC output 70 from the battery bank 36 can be tied into the DC circuit 60 to communicate the DC output 70 from the battery bank 36, through the charging station 38, and then to the battery pack 24 once an electrified vehicle has been connected to the charging station 38.

In a first non-limiting embodiment, shown in FIG. 5, the DC output 70 of the battery bank 36 is tied into the charging station 38 just upstream of rectifier diodes 72 of the rectification stage 64. The rectification stage 64 is located at an inlet of the DC circuit 60. In this upstream embodiment, for example, the DC output 70 of the battery bank 36 is connected to a power cord 74 of the charging station 38, which typically receives the 3-phase AC power from the external power source 35.

In a second non-limiting embodiment, shown in FIG. 6, the DC output 70 of the battery bank 36 is tied into the charging station 38 just downstream of the rectifier diodes 72 of the rectification stage 64. In this downstream embodiment, for example, the DC output 70 of the battery bank 36 is tied into a DC link capacitor 76 of the DC circuit 60. Other interfacing configurations between the battery bank 36 and the charging station 38 may also be suitable for transferring the DC output 70 from the battery bank 36 to an electrified vehicle plugged into the charging station 38.

In another non-limiting embodiment, the DC output from the battery packs 42 of the battery bank 36 is converted to an AC output prior to transferring the power to the charging station 38.

The vehicle charging systems of this disclosure provide a finite number of DC fast charging events in a manner that reduces grid strain without requiring relatively costly grid infrastructure upgrades. The vehicle charging systems described herein offer an intermediate solution between unlimited DC fast charging capability and Level 2 (AC) charging. The proposed designs further offer an environmentally friendly, modular approach to adapting the concept to existing charging stations without the need to completely redesign existing charging stations, thus resulting in favorable economics that encourage wide-scale installation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle charging system, comprising: a battery bank including at least one repurposed battery and at least one non-repurposed battery; and a charging station in electrical communication with said battery bank and configured to deliver a DC output from said battery bank to an electrified vehicle; wherein said battery bank is electrically connected to said charging station upstream of rectifier diodes of a rectification stage of a DC circuit of said charging station; or said battery bank is electrically connected to said charging station downstream of rectifier diodes of a rectification stage of a DC circuit of said charging station.

2. The vehicle charging system as recited in claim 1, wherein said battery bank is housed inside said charging station.

3. The vehicle charging system as recited in claim 1, wherein said battery bank is housed separately from said charging station.

4. The vehicle charging system as recited in claim 1, comprising a cooling system configured to thermally manage said battery bank.

5. The vehicle charging system as recited in claim 4, wherein said cooling system includes a chiller.

6. The vehicle charging system as recited in claim 1, wherein said battery bank includes a plurality of battery assemblies.

7. The vehicle charging system as recited in claim 1, comprising a controller configured to control operation of said battery bank and said charging station during DC fast charging events.

8. The vehicle charging system as recited in claim 7, wherein said controller is configured to schedule charging of said battery bank during off-peak conditions of an external power source.

9. The vehicle charging system as recited in claim 1, comprising supply equipment extending outside of a housing of said charging station.

10. The vehicle charging system as recited in claim 1, wherein said at least one repurposed battery is a repurposed electrified vehicle battery pack.

11. The vehicle charging system as recited in claim 1, comprising an inverter disposed between said battery bank and an external power source.

12. The vehicle charging system as recited in claim 1, wherein said DC output of said battery bank is connected to a power cord of said charging station.

13. The vehicle charging system as recited in claim 1, wherein said DC output of said battery bank is connected to a DC link capacitor of said DC circuit.

14. The vehicle charging system as recited in claim 1, comprising a second charging station in electrical communication with said battery bank.

15. The vehicle charging system as recited in claim 1, wherein said at least one repurposed battery is a battery previously used for a different purpose that is unrelated to said battery bank of said charging station.

16. A method, comprising:
charging a battery bank of a vehicle charging system using AC power from an external power source, wherein the battery bank includes a repurposed battery, wherein the battery back is electrically connected to a charging station of the vehicle charging system by connecting a DC output from the battery bank to the charging station either upstream or downstream of rectifier diodes of a first rectification stage of a DC circuit of the charging station;
charging a battery pack of an electrified vehicle using DC power stored in the battery bank.

17. A vehicle charging system, comprising: a charging station; and a battery bank electrically connected to said charging station either upstream or downstream of rectifier diodes of a rectification stage of a DC circuit of said charging station: wherein said battery bank includes a repurposed battery, and said DC circuit is housed inside a housing of said charging station.

18. The vehicle charging system as recited in claim 17, wherein said DC circuit is housed inside a housing of said charging station and includes an active power filter, said rectification stage, a switching stage, a filtering stage, and a protection circuit.

19. The vehicle charging system as recited in claim 18, wherein said switching stage is downstream from said rectification stage, said filtering stage is downstream from said switching stage, and said protection circuit is downstream from said filtering stage.

20. The vehicle charging system as recited in claim 18, wherein said active power filter is connected to said charging station upstream of said rectifier diodes.

21. The vehicle charging system as recited in claim 18, wherein said protection circuit is electrically coupled to a battery pack of an electrified vehicle being charged by the charging station.

22. The vehicle charging system as recited in claim 17, wherein a DC output of said battery bank is connected to a power cord of said charging station.

23. The vehicle charging system as recited in claim 17, wherein a DC output of said battery bank is tied into a DC link capacitor of said DC circuit.

24. The vehicle charging system as recited in claim 17, wherein said rectification stage is located at an inlet of said DC circuit.

25. The vehicle charging system as recited in claim 17, wherein said battery bank is electrically connected to said charging station immediately upstream of said rectifier diodes, and a DC output of said battery bank is directly coupled to a power cord of said charging station.

26. The vehicle charging system as recited in claim 17, wherein said battery bank is electrically connected to said charging station immediately downstream of said rectifier diodes, and a DC output of said battery bank is directly coupled to a DC link capacitor of said charging station.

27. The vehicle charging system as recited in claim 17, wherein a DC output of said battery bank is directly coupled to said rectification stage, and further wherein said rectification stage is located at an inlet of said DC circuit of said charging station.

* * * * *